(12) United States Patent
Hendel et al.

(10) Patent No.: US 9,729,459 B2
(45) Date of Patent: Aug. 8, 2017

(54) SYSTEM AND METHOD FOR CREDIT-BASED LINK LEVEL FLOW CONTROL

(71) Applicant: Avago Technologies General IP (Singapore) Pte. Ltd., Singapore (SG)

(72) Inventors: Ariel Hendel, Cupertino, CA (US); K. R. Kishore, Saratoga, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 184 days.

(21) Appl. No.: 13/686,312

(22) Filed: Nov. 27, 2012

(65) Prior Publication Data

US 2014/0140206 A1 May 22, 2014

Related U.S. Application Data

(60) Provisional application No. 61/728,010, filed on Nov. 19, 2012.

(51) Int. Cl.
| | |
|---|---|
| *H04L 1/00* | (2006.01) |
| *H04L 12/805* | (2013.01) |
| *H04L 12/835* | (2013.01) |
| *H04L 12/801* | (2013.01) |

(52) U.S. Cl.
CPC .............. *H04L 47/36* (2013.01); *H04L 47/30* (2013.01); *H04L 47/39* (2013.01)

(58) Field of Classification Search
CPC ......... H04L 47/10; H04L 47/12; H04L 47/20; H04L 47/24; H04L 47/32; H04L 47/38; H04L 47/70; H04L 47/72; H04L 47/74; H04L 47/78; H04L 47/80; H04L 47/52; H04W 28/02; H04W 28/0205; H04W 28/021; H04W 28/0247
USPC .......................... 370/229, 230, 232, 235, 234
See application file for complete search history.

(56) References Cited

U.S. PATENT DOCUMENTS

| | | | |
|---|---|---|---|
| 2009/0077274 A1* | 3/2009 | Caruk et al. | 710/29 |
| 2012/0275301 A1* | 11/2012 | Xiong | 370/230 |

FOREIGN PATENT DOCUMENTS

| | | |
|---|---|---|
| CN | 1691590 | 11/2005 |
| CN | 101115008 | 1/2008 |
| CN | 101115053 A | 1/2008 |
| CN | 101123573 | 2/2008 |
| CN | 101399770 | 4/2009 |

(Continued)

OTHER PUBLICATIONS

Fibre Channel Industry Association, Fibre Channel Features, 2012.

(Continued)

*Primary Examiner* — Dady Chery
(74) *Attorney, Agent, or Firm* — Foley & Lardner LLP

(57) ABSTRACT

A system and method for credit-based link level flow control. In one embodiment, a byte-based flow control mechanism is based on a sender effectively maintaining a buffer state at the receiver. In maintaining a buffer state at the receiver, the sender is provided with information regarding byte expansion at the receiver. This byte-expansion information can be used by the sender to identify the amount of additional storage needed by the receiver when storing a packet transmitted by the sender in the receiver's packet buffer.

20 Claims, 4 Drawing Sheets

(56) References Cited

FOREIGN PATENT DOCUMENTS

CN 101828177 9/2010
CN 102595506 7/2012

OTHER PUBLICATIONS

Kung et al., Credit-Based Flow Control for ATM Networks, IEEE Network Magazine, Mar. 1995.
InfiniBand Architecture Specification, vol. 1, Release 1.1, Nov. 6, 2002.
Office Action for Chinese Patent Application No. 2013105858851 mailed Jun. 27, 2016 (including English summary).

* cited by examiner

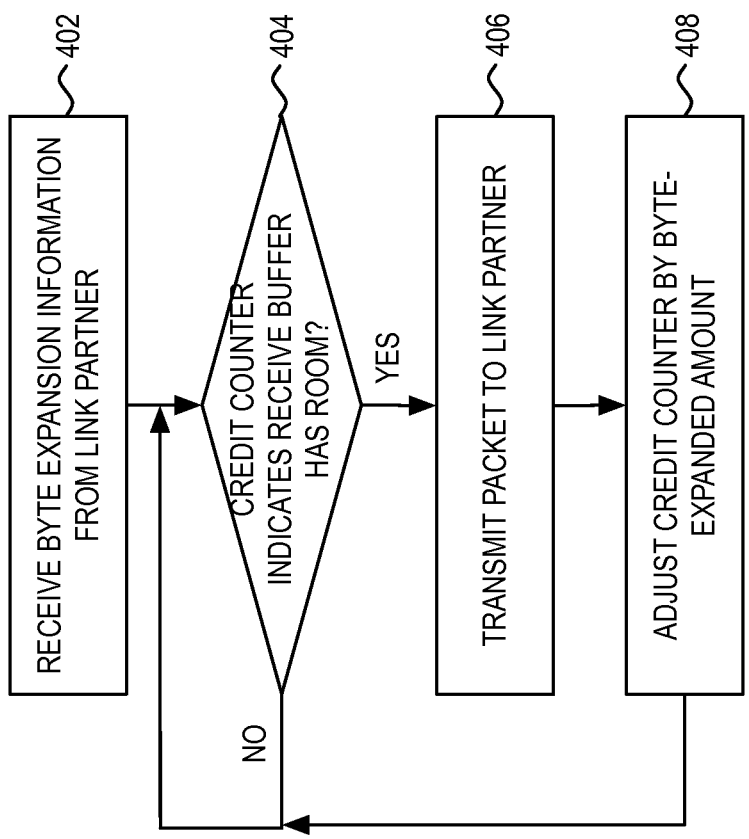

SYSTEM AND METHOD FOR CREDIT-BASED LINK LEVEL FLOW CONTROL

This application claims priority to provisional application No. 61/728,010, filed Nov. 19, 2012, which is incorporated herein by reference in its entirety.

BACKGROUND

Field of the Invention

The present invention relates generally to networking and, more particularly, to a system and method for credit-based link level flow control.

Introduction

Increasing demands are being placed upon the data communications infrastructure. These increasing demands are driven by various factors, including increasing bandwidth and latency requirements. For example, while 10 Gigabit Ethernet (GbE) ports are commonly used for I/O on many of today's network switches, 40 GbE and 100 GbE ports are also anticipated to be commonplace in the near future. A key issue looking forward is the ability of the data communications infrastructure to scale in bit rate while retaining its ability to provide lossless operation.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof, which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 4 illustrates a flowchart of a process of the present invention.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The provision of lossless operation in data center networks is dependent on the efficient management of packet buffers. Such packet buffer management is key to ensuring that there are no packet drops due to congestion. It is a feature of the present invention that a byte-based flow control mechanism can be used. In one embodiment, the byte-based flow control mechanism is based on a sender effectively maintaining a buffer state at the receiver. In maintaining a buffer state at the receiver, the sender is provided with information regarding byte expansion at the receiver. This byte-expansion information can be used by the sender to identify the amount of additional storage needed by the receiver when storing a packet transmitted by the sender in the receiver's packet buffer.

In association with a transmission of a packet by a sender, the sender is configured to use the byte-expansion information to determine an adjustment for the buffer state at the receiver. In one embodiment, the determined adjustment is used to adjust a credit counter at the sender, which credit counter reflects the level of fullness of the receiver's packet buffer. When the reading of the sender's credit counter indicates that room is available in the receiver's packet buffer, a packet is transmitted and the credit counter is adjusted using the byte size of the transmitted packet plus the number of additional bytes indicated by the byte expansion information. As the byte expansion information enables the sender to maintain an actual byte count at the receiver's packet buffer, headroom considerations are removed. Efficiency of packet buffer management is thereby increased.

In providing lossless performance, a sender and a receiver are configured to cooperate to ensure that all of the packets that are sent by the sender can be accommodated by the packet buffer at the receiver. In a priority-based flow control scheme such as that defined in IEEE 802.1Qbb, such performance is dependent on the guaranteed headroom of the packet buffer.

Figure 1:
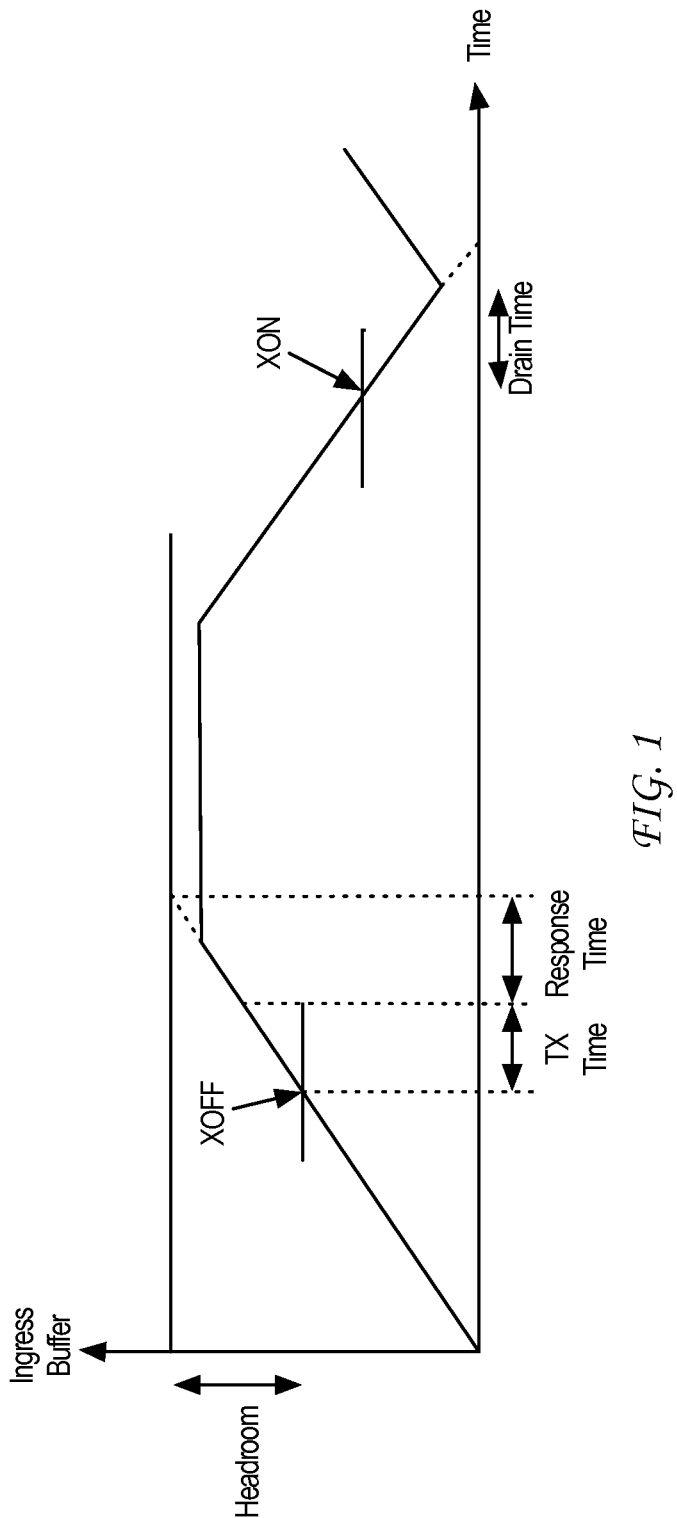
FIG. 1 illustrates an example of buffering using flow control.

FIG. 1 illustrates the needed headroom in a packet buffer used in a priority-based flow control scheme. In the priority-based flow control scheme, the pause duration for each class of service is a 2-byte value that expresses time as a number of quanta, where each quantum represents the time needed to transmit 512 bits at the current network speed. In this framework, a receiver using priority-based flow control is configured to anticipate potential buffer exhaustion for a class of service and generate a pause frame for that class of service when such a situation arises. The pause frame is then transmitted to the sender so that the sender has a sufficient amount of time to stop transmitting before the packet buffer in the receiver overflows.

FIG. 1 illustrates that amount of headroom needed. This amount of headroom is shown as corresponding roughly to the packet buffer level unused at which the receiver will send a pause frame to the sender to stop transmission (XOFF). As illustrated, the transmission of the pause frame does not immediately stop the packet buffer from continuing to fill. This is due in large part to the amount of time that it takes for the pause frame to traverse the link (TX Time) and for the amount of time that it takes for the sender to process the pause frame (Response Time) in stopping further packet transmission.

Here, it should be noted that the length of the link affects how early the receiver must act to prevent the buffer from filling up and packets being lost. The longer the link, the earlier a receiver should send a pause frame to the sender. In general, the various considerations of transmission and processing delays in a priority-based flow control scheme must consider worst-case scenarios for buffering. The consequence of accommodating these worst-case scenarios is that greater amounts of the scarce buffering resource for the packet buffers is needed.

As would be appreciated, the buffer sizing is also dependent on the link speed. The faster the link speed, the greater the amount of headroom needed. Consider, for example, the increase of link speeds from 10 GbE to 40 GbE, or from 10 GbE to 100 GbE. This increase in link speeds can place great demands on headroom buffer demands (e.g., hundreds of Kbytes) as the limitations of priority-based flow control scheme are accentuated. The resulting effect is the limitation on the number of lossless classes of services that can be enabled on a link. This limitation can have significant consequences on the quality of service. Further, it should be noted that the total amount of headroom per device is proportional to the number of ports supported by the device. As high port density is desirable, greater efficiency in packet buffer allocation is desired.

It is therefore a feature of the present invention that a new flow control mechanism is provided that is byte-based rather than (elapsed) time-based such as that exemplified by priority-based flow control schemes. In general, it is desired that the new flow control mechanism be insensitive to how packets are stored at the receiver (e.g., amount of metadata added or cell sizes), self-synchronizing, low in overhead, and can be used asymmetrically per link direction.

Figure 2:
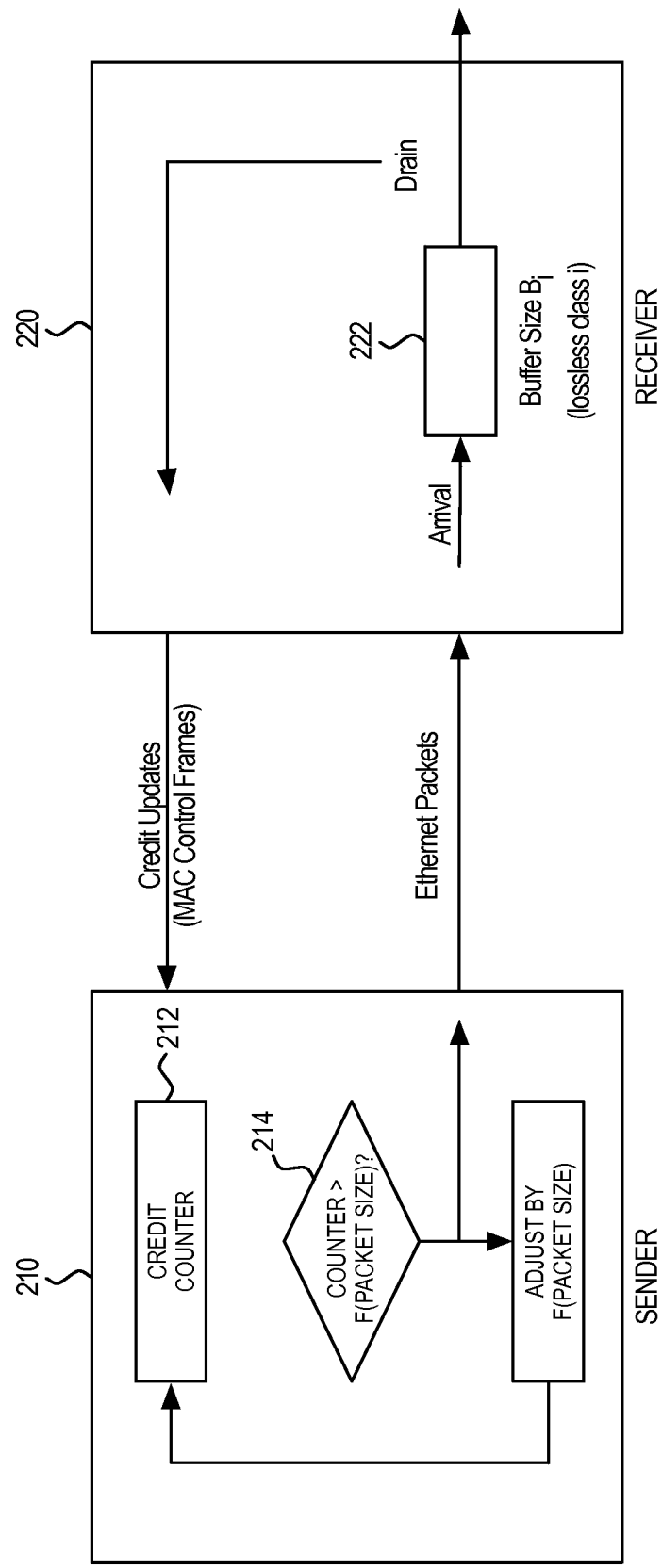
FIG. 2 illustrates an example embodiment of credit-based flow control.

FIG. 2 illustrates an example embodiment of a credit-based flow control mechanism that is effected on a link between sender 210 and receiver 220. Here, sender 210 and receiver 220 can represent a switch, a server, a network interface card (NIC), or any other network device that can operate as a link partner. Included within receiver 220 is packet buffer 222, which can have a size $B_i$ to handle a particular lossless class of traffic "i".

As illustrated, sender 210 includes credit counter 212, which enables sender 210 to effectively maintain the state of packet buffer 222 in receiver 220 in the form of credits. It is a feature of the present invention that the maintenance by sender 210 of the state of packet buffer 222 in receiver 220 obviates the need to account for the worst-case arrival of packets. As will be described in greater detail below, the shift in accounting of credits from receiver 220 to sender 210, along with the maintenance of actual byte counts, eliminates the need for substantial headroom such as that illustrated in the priority-based flow control scheme.

Here, it should be noted that byte credits are generally more precise than packet credits in theory. Accounting for byte credits, however, has been problematic due to byte expansion at the receiver for the storage of metadata and the management of buffers with larger granularity than a byte (e.g., cells or pages). In the present invention, byte-credit flow control is augmented with a byte expansion function at the sender f(packet size), which represents the byte expansion performed at the receiver. Here, the byte expansion at the receiver represents the actual amount of buffer storage used by the receiver when storing a packet of a given packet size received from the sender. With the knowledge of the byte expansion performed by the receiver, the sender is now able to accurately account for the storage state of the packet buffer at the receiver. Thus, as the sender transmits packets to the receiver, the sender can update the credit counter using the byte expansion function to maintain and track the state of the actual usage of the packet buffer in the receiver.

By maintaining state of the packet buffer in the receiver, the sender can make a determination of whether or not a packet can be sent to the receiver. As illustrated in FIG. 2, sender 210 can be configured to implement determination 214 as to whether the credit counter indicates that a byte expansion f(packet) of a packet to be sent can fit in the available space in packet buffer 222 in sender 220. As would be appreciated, determination 214 can be performed by machine code and/or a computer program having at least one code section executable by a machine and/or a computer, thereby causing the machine and/or computer to perform the determination.

If determination 214 indicates that byte-expanded packet can be stored in available space in packet buffer 222, then sender 210 sends the packet to receiver 220. The receiver would then store a byte-expanded packet into packet buffer 222. In association with the sending of the packet to receiver 220, an adjustment of credit counter 212 is made based on the byte-expansion function as applied to the packet that is sent.

Here, it should be noted that the adjustment of credit counter 212 using the byte expansion function as applied to the transmitted packet is intended to reflect the decrease in available storage space in packet buffer 222. As the byte-expansion function f(packet) is known a priori by sender 210, sender 210 is effectively able to maintain state of packet buffer 222 in receiver 220. As such, transmission by sender 210 can be paused after accounting for actually transmitted bytes on the wire as compared to a worst-case possibility of bytes on the wire.

Figure 3:
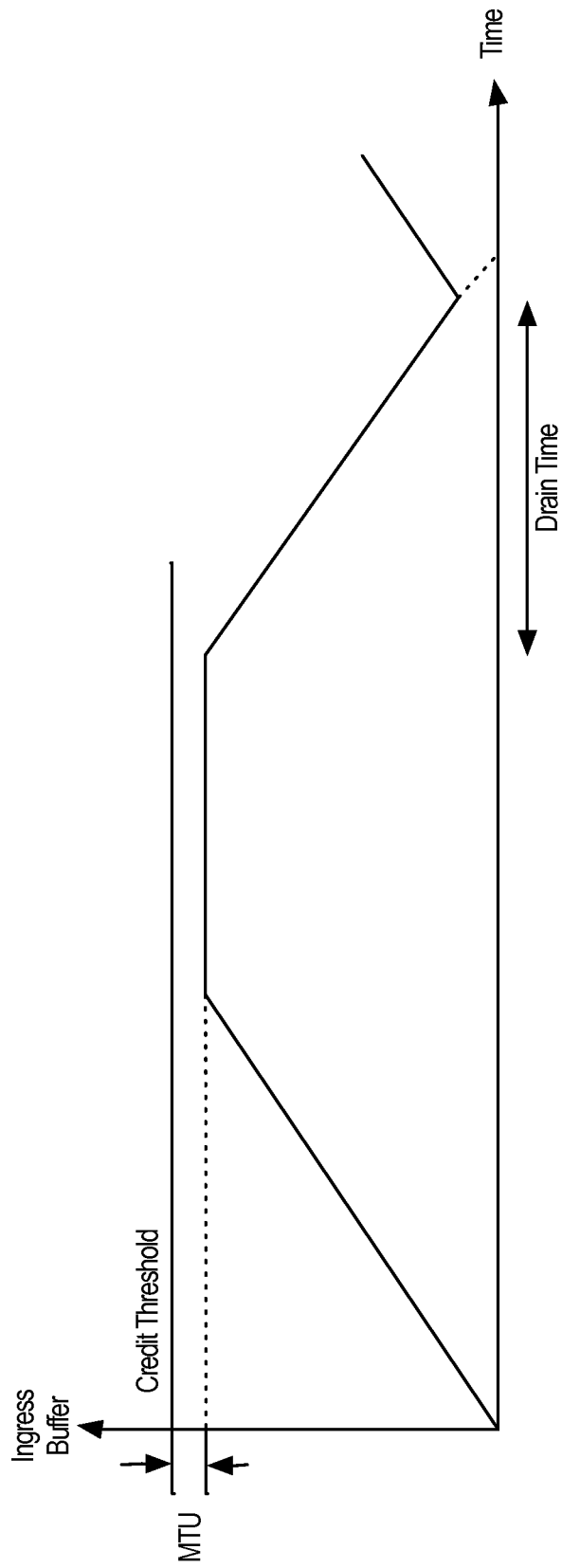
FIG. 3 illustrates an example of buffering using credit-based flow control.

FIG. 3 illustrates an example of buffering using credit-based flow control according to the present invention. As illustrated, a credit threshold is established to reflect a size of the packet buffer. As packets are transmitted from the sender to the receiver, the packet buffer can continue to fill. Credit counter 212 would continue to be adjusted based on the byte-expansion function f(packet) to reflect the decrease in the available portion of packet buffer 222. Based on determination 214, sender 210 would continue to send packets until credit counter 212 indicated that a byte-expanded packet could not fit in the remaining available portion of packet buffer 222. Here, it should be noted that the pausing of further transmissions is based on determination 214 using credit counter 214, not the receipt of a pause frame from receiver 220.

In the example of FIG. 3, the pausing of further transmissions is illustrated as occurring when the credit counter indicates that the byte-expansion of the next packet to be transmitted cannot fit in the remaining available portion of the packet buffer. As this pausing is based on the size of the packet, the level at which the pause can occur is illustrated as being on the order of a maximum transmission unit (MTU) size (e.g., 1.5 Kbytes, 2 Kbytes, 9.6 Kbytes, etc.). As would be appreciated, the relatively small amounts associated with MTU sizes relates to an actual byte count, and is far smaller than the hundreds of Kbytes for headroom that can be associated with transmission and response times.

As long as credit counter 212 indicates that a byte-expanded packet could not fit in the remaining available portion of packet buffer 222, sender 210 would not transmit any packets. This condition would remain until packet buffer 222 is drained at receiver 220. In the present invention, updates that reflect the bytes drained from packet buffer 222 are based on messages that are sent from receiver 220 to sender 210. In one embodiment, the update messages can use MAC control frames in a similar manner to priority-based flow control schemes.

In one embodiment, credit counter 212 in sender 210 is a circular counter. This circular counter can have the same number of bits as a circular counter in the receiver. The circular counter at the sender can be incremented by an expansion applied to the bytes sent, and the circular counter at the receiver can be incremented by the expanded bytes that are stored in the packet buffer. In one embodiment, the sender can be configured to periodically send a synchronization packet, which includes the value of the counter at the time the synchronization packet is sent, and the receiver can send an update that returns the value of its circular counter plus the available buffer at the time of receipt of the synchronization packet. In general, the loss of a credit update is harmless, as the system would recover on the next update. Self-synchronization is therefore provided as it can recover from data packet loss and credit update loss.

Having described a framework for credit-based flow control, reference is now made to the flowchart of FIG. 4 to illustrate a process of the present invention. As illustrated, the process begins at step 402 where byte expansion information is received from the link partner. As noted, the credit-based flow control mechanism can operate asymmetrically on a link. Accordingly, the process of step 402 can be part of a broader exchange of flow control capability information between link partners.

In one embodiment, the capability exchange can be facilitated by the Data Center Bridging eXchange (DCBX) protocol. In one example, the DCBX protocol can be used to advertise and exchange credit-based flow control information. In various scenarios, link partners can advertise their support for credit-based flow control information, negotiate the number of bits in the credit counters, provide byte-expansion information from the receiver to the sender, or any other information that would enable operation of credit-based flow control.

After at least one direction of a link is established with credit-based flow control, a credit counter is then enabled to monitor the state of the receiver's packet buffer relative to an established credit threshold. During run-time, a sender can then determine, at step 404, whether a credit counter indicates that the receiver's packet buffer has room to accommodate a byte-expanded packet. This determination is facilitated by the previous provision of byte-expansion information by the receiver to the sender.

If it is determined, at step 404, that the credit counter indicates that the receiver's packet buffer does not have room to accommodate a byte-expanded packet, then the process would loop back for further checks of the credit counter. As noted with reference to FIG. 3, the credit counter can be adjusted based on credit updates provided by the receiver that indicates that bytes have been drained from the packet buffer. Here, it should be noted that while the particular credit update mechanism is implementation dependent, the credit update interval of the receiver could affect throughput in the system.

If it is determined, at step 404, that the credit counter indicates that the receiver's packet buffer does have room to accommodate a byte-expanded packet, then a packet can be transmitted, at step 406, from the sender to the receiver for storage in the receiver's packet buffer. Next, at step 408, the credit counter is adjusted based on the byte-expanded amount that of the transmitted packet that is determined using the previously received byte expansion information. This adjustment to the credit counter at the sender enables the sender to maintain the state of the receiver's packet buffer. The process would then loop back to step 404 for further checks of the credit counter during run time.

It should be noted that the ordering of the steps in the flowchart of FIG. 4 is provided for illustration purposes only. In actual implementation, some of the steps can be performed concurrently or in an alternate order. The specified ordering between any two steps would only be required where the operation of a particular step was strictly dependent on an input that was generated by another step.

As has been described, the credit-based flow control mechanism can guarantee lossless behavior without requiring substantial headroom to address link length, processing delays, etc. In general, lossless behavior can be guaranteed regardless of credit threshold level, packet sizes, traffic pattern, propagation delays, etc. As compared to priority-based flow control, higher throughput can be achieved for a given amount of buffering in lossless mode, or lower amount of buffering would be required to achieve a given throughput in a lossless link.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method, comprising:
receiving, by a first link partner from a second link partner, byte expansion information regarding byte expansion performed at the second link partner when the second link partner stores a packet received from the first link partner;
transmitting a first packet from the first link partner to the second link partner; and
adjusting, by the first link partner, a credit counter in the first link partner by an amount that corresponds to a first number of bytes in the transmitted first packet plus a second number of bytes determined using the byte expansion information received from the second link partner, the second number of bytes indicating an amount of additional storage for the second link partner to store the transmitted first packet.

2. The method of claim 1, further comprising negotiating a number of bits used by the credit counter.

3. The method of claim 1, wherein the negotiation comprises negotiating using Data Center Bridging exchange (DCBX).

4. The method of claim 1, further comprising determining, by the first link partner, whether to transmit the first packet based on a value of the credit counter.

5. The method of claim 4, wherein the determining comprises determining whether a value of the credit counter indicates that the second link partner has an amount of space greater than a number of bytes associated with a next packet to be transmitted.

6. The method of claim 1, further comprising adjusting a value of the credit counter based on a synchronization packet received by the first link partner from the second link partner, the synchronization packet enabling the first link partner to synchronize a value of the credit counter with a second credit counter in the second link partner.

7. The method of claim 1, further comprising transmitting a synchronization packet from the first link partner to the second link partner, the synchronization packet including a value of the credit counter.

8. The method of claim 1, wherein the credit counter is a circular counter.

9. A method, comprising:
transmitting, by a first link partner to a second link partner, information regarding byte expansion performed by the first link partner;

receiving, by the first link partner, a packet from the second link partner;

storing in a buffer, by the first link partner, a byte-expanded packet expanded based on the received packet; and adjusting, by the first link partner, a credit counter based on a number of bytes of the byte-expanded packet, wherein the number of bytes of the byte-expanded packet includes a first number of bytes of the received packet and a second number of bytes indicating an amount of additional storage for the second link partner to store the received packet.

10. The method of claim 9, further comprising negotiating a number of bits used by the credit counter.

11. The method of claim 10, wherein the negotiation comprises negotiating using Data Center Bridging eXchange (DCBX).

12. The method of claim 9, further comprising transmitting a self-synchronization packet from the first link partner to the second link partner, the self-synchronization packet including a value of the credit counter.

13. The method of claim 9, wherein the credit counter is a circular counter.

14. A system comprising:

a first network device configured to:

receive, from a second network device, byte expansion information regarding byte expansion performed at the second network device when the second network device stores a packet received from the first network device;

transmit a first packet from the first network device to the second network device; and adjust a credit counter in the first network device by an amount that corresponds to a first number of bytes in the transmitted first packet plus a second number of bytes determined using the byte expansion information received from the second network device, the second number of bytes indicating an amount of additional storage for the second network device to store the transmitted first packet.

15. The system of claim 14, wherein the first network device is further configured to negotiate a number of bits used by the credit counter.

16. The system of claim 15, wherein the first network device is further configured to negotiate the number of bits used by the credit counter using Data Center Bridging eXchange (DCBX).

17. The system of claim 14, wherein the first network device is further configured to determine whether to transmit the packet based on a value of the credit counter.

18. The system of claim 17, wherein the determining further comprises the first network device configured to determine whether a value of the credit counter indicates that the second network device has an amount of space greater than a number of bytes associated with a next packet to be transmitted.

19. The system of claim 14, wherein the first network device is further configured to adjust a value of the credit counter based on a synchronization packet received by the first network device from the second network device, the synchronization packet enabling the first network device to synchronize a value of the credit counter with a second credit counter in the second network device.

20. The system of claim 14, wherein the first network device is further configured to transmit a synchronization packet from the first network device to the second network device, said synchronization packet including a value of the credit counter.

* * * * *